United States Patent
Streinz et al.

(10) Patent No.: US 9,631,675 B2
(45) Date of Patent: Apr. 25, 2017

(54) CONNECTION DEVICE FOR A SHAFT

(71) Applicant: Bayerische Motoren Werke Aktiengesellschaft, Munich (DE)

(72) Inventors: Wolfgang Streinz, Landshut (DE); Armin Zeilner, Pfettrach (DE); Johann Reindl, Ergoldsbach (DE); Josef Hofstetter, Wimpasing (DE); Heinrich Gruenwald, Altdorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/851,582

(22) Filed: Sep. 11, 2015

(65) Prior Publication Data

US 2016/0003304 A1  Jan. 7, 2016

Related U.S. Application Data

(63) Continuation of application No. PCT/EP2014/053522, filed on Feb. 24, 2014.

(30) Foreign Application Priority Data

Mar. 12, 2013 (DE) .................. 10 2013 204 181

(51) Int. Cl.
*F16D 1/10* (2006.01)
*F16C 3/02* (2006.01)
(Continued)

(52) U.S. Cl.
CPC ................ *F16D 1/10* (2013.01); *F16C 3/023* (2013.01); *F16C 3/026* (2013.01); *F16D 1/087* (2013.01);
(Continued)

(58) Field of Classification Search
CPC .. F16C 3/02; F16C 3/026; F16B 11/02; F16B 11/008; F16B 17/002; F16B 17/004; Y10T 403/62
See application file for complete search history.

(56) References Cited

U.S. PATENT DOCUMENTS 4,173,128 A  11/1979 Corvelli
4,238,539 A * 12/1980 Yates ..................... B29C 70/32
                                                    156/172
(Continued)

FOREIGN PATENT DOCUMENTS

CN  101272927 A  9/2008
CN  101292093 A  10/2008
(Continued)

OTHER PUBLICATIONS

European Office Action issued in counterpart European Application No. 14 705 794.7 dated Oct. 20, 2016 (five (5) pages).
(Continued)

*Primary Examiner* — Jonathan Masinick
(74) *Attorney, Agent, or Firm* — Crowell & Moring LLP

(57) ABSTRACT

A lightweight construction connection device is provided for a shaft, formed from an end section of a pipe segment, over which the shaft can be slid and having a knurling on the radial outside surface thereof. A support ring is arranged in the interior of the end section of the pipe segment.

18 Claims, 1 Drawing Sheet

(51) Int. Cl.
    *F16D 1/08*     (2006.01)
    *B60K 17/22*    (2006.01)
(52) U.S. Cl.
    CPC ............ *F16D 1/0858* (2013.01); *B60K 17/22* (2013.01); *F16D 2001/103* (2013.01)

(56)            References Cited

U.S. PATENT DOCUMENTS

| 4,265,951 A * | 5/1981 | Yates ................ B29D 99/0046 |
| | | 156/172 |
| 5,253,947 A * | 10/1993 | Petrzelka ................ B29C 65/64 |
| | | 403/274 |
| 5,601,493 A | 2/1997 | Nakazono et al. |
| 2004/0082394 A1 | 4/2004 | Lee et al. |
| 2008/0012329 A1 | 1/2008 | Dewhirst |
| 2008/0248886 A1 | 10/2008 | Disser et al. |
| 2009/0203453 A1 | 8/2009 | Heinrich et al. |
| 2012/0157217 A1 | 6/2012 | Nakamura et al. |

FOREIGN PATENT DOCUMENTS

| CN | 102472310 A | 5/2012 | |
| DE | 3926427 C1 * | 12/1990 | ............ B60K 17/22 |
| DE | 198 42 821 A1 | 4/2000 | |
| DE | 10150616 C1 * | 2/2003 | ............ B62D 1/181 |
| DE | 102 08 706 A1 | 9/2003 | |
| DE | 103 12 056 B3 | 11/2004 | |
| DE | 10 2007 001 253 A1 | 11/2007 | |
| FR | 2564538 A1 * | 11/1985 | ............ F16C 3/026 |
| FR | 2653505 A1 * | 4/1991 | ............ F16C 3/026 |
| GB | 698902 | 10/1953 | |
| GB | 2 071 812 A | 9/1981 | |
| WO | WO 2007/036343 A1 | 4/2007 | |

OTHER PUBLICATIONS

Chinese Office Action issued in counterpart Chinese Application No. 201480004702.5 dated Sep. 5, 2016 with English translation (14 pages).

* cited by examiner

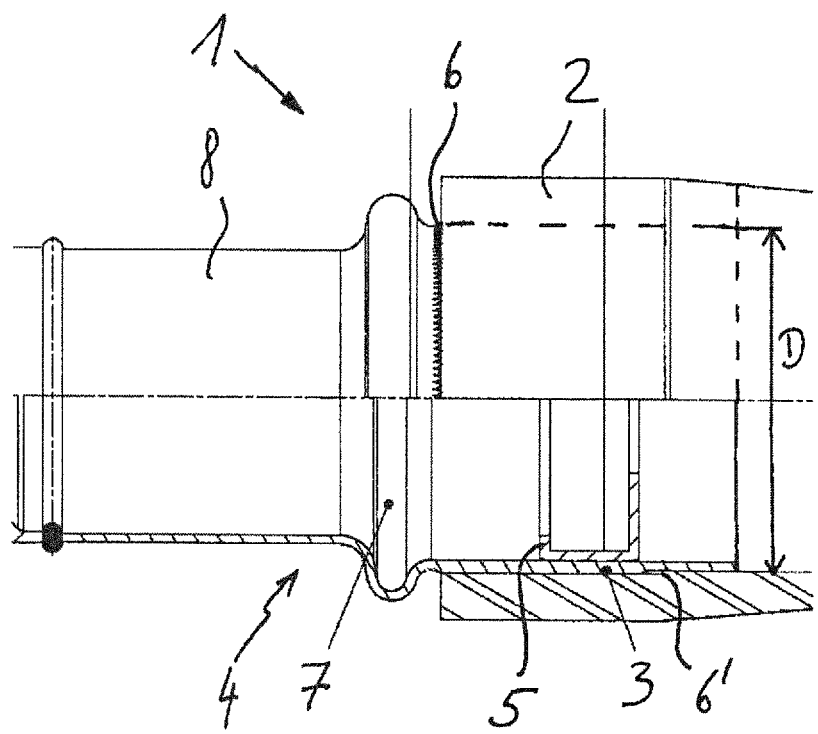

CONNECTION DEVICE FOR A SHAFT

CROSS REFERENCE TO RELATED APPLICATIONS

This application is a continuation of PCT International Application No. PCT/EP2014/053522, filed Feb. 24, 2014, which claims priority under 35 U.S.C. §119 from German Patent Application No. 10 2013 204 181.0, filed Mar. 12, 2013, the entire disclosures of which are herein expressly incorporated by reference.

BACKGROUND AND SUMMARY OF THE INVENTION

The invention relates to a connection device for a shaft, formed from an end section of a pipe segment.

For the development of new parts, the topic of a lightweight construction is particularly significant in various technical fields, especially in the field of automotive engineering. Fiber-reinforced plastic materials play an increasingly important role in this respect. These have been used not only for motor vehicle body components but, for example, also for shafts (drive shafts). For this purpose, it is necessary to connect shafts made of fiber-reinforced plastics, particularly of CFRPs, with steel or aluminum components. In the case of a connection device of a drive shaft, high torsional moments are to be transmitted, so that correspondingly larger dimensions are selected, which are relatively heavy.

From the state of the art, it is known to ensure that such connections are constructed as knurled connections, where steel or aluminum attachment parts having a large wall thickness are pressed and glued into a CFRP pipe. The steel or aluminum attachment parts are pipe-shaped and, in the state of the art, have a thickness of at least 4 mm. This ensures that the pipe segments will not radially collapse during the pressing-in. This is necessary in order to transmit the high torsional moments between the attachment part and the shaft without failure of the connection. This connection frequently also determines the crash behavior, in which case the attachment part is pressed into the pipe. As a result of the many influencing variables, the crash forces may vary widely, causing the pipe to burst.

However, the use of thick-walled pipes having a wall thickness of 4 mm or more will result in considerable overall weight of the connection of the shaft and the steel or aluminum attachment part, whereby the significant weight advantage is impaired by the use of a shaft made of the CFRP material.

For reducing the weight of the connection device, developers have always had the desire to construct the pipe-shaped attachment parts of steel or aluminum in a thin-walled fashion, in order to reduce the overall weight. However, a thin-walled design could not reliably transmit torsional moments and does not supply sufficient stability in the event of a crash.

It is therefore an object of the present invention to provide a connection device for a shaft to an attachment part that is capable of transmitting the torsional moments required in motor vehicle construction with the customary reliability, and simultaneously meeting necessary crash requirements with respect to essential energy absorption.

This and other objects are achieved by a connection device for a shaft formed of an end section of a pipe segment, over which the shaft can be pushed. On a radial outer surface of an end section of the pipe segment, an external toothing is provided. A supporting ring is arranged in the interior of the end section of the pipe segment.

The use of a supporting ring is advantageous in that the end section of the pipe segment is stabilized precisely in the area where the shaft is also arranged. In a preferred embodiment, the supporting ring is pressed into the end section of the pipe segment, in order for the end section to withstand the high radial forces when the shaft is pressed onto the end section. The end section of the pipe segment therefore retains its original shape, although its wall thickness is considerably reduced compared to the end sections used in prior art. The supporting ring is preferably constructed of steel.

The advantageous use of the supporting ring has the result that a measurement of 1.2 to 2.5 mm may be selected for the end section. Preferably, a wall thickness of 1.5 to 2.2 mm, and even more preferably, a wall thickness of 1.6 to 1.9 mm can be selected. The outside diameter of the supporting ring is minimally larger than the inside diameter of the end section of the pipe segment, so that, after the pressing into the end section, the supporting ring is fixed in the end section as a press fit. The supporting ring is preferably arranged in the axial direction in the center in the area of the end section in which the external toothing is provided.

In a preferred embodiment, the supporting ring has an axial dimension of from 10 to 20 mm, preferably an axial dimension of from 10 to 15 mm. It is thereby ensured that sufficient support is provided with respect to the radial forces arising during the pressing-on of the shaft, without any canceling of the weight advantage as a result of the thin-walled construction of the end section of the pipe segment. The weight savings of a pipe section of, for example, a wall thickness of 1.8 mm compared to those of the prior art having a wall thickness of 4 mm amount to at least 40%.

An implementation of the external toothing of the end section of the pipe segment as a knurling is preferred and is generated by milled knurling. A radial outer surface created by milled knurling presents a large contact surface for the shaft to be pushed on later, so that high torsional moments can be transmitted, which in each case reach a magnitude desired for vehicle construction.

Furthermore, the connection device is characterized in that standard pipes are used whose end section is reduced to a predefined diameter. This has the advantage that a predefined pipe, for example, of a diameter of 70 mm, can be reduced to an end diameter of 60 or 55 mm, depending on which inside shaft diameter is to be pushed on. As a result, it becomes possible to weld together identical parts of the drive shaft assembly or to meet packaging demands customary in vehicle construction. Special-grade cardan tubes, for example, are used as pipe segments.

In a preferred embodiment, a bead is provided at the end section, which bead forms a predetermined breaking point. Such predetermined breaking points are provided for meeting crash demands, in which case the component fails in a predetermined direction in the event of a predefined load. The bead is formed by a circumferential radial bulging adjoining the knurling or external toothing.

In a preferred embodiment of the invention, it is further provided that a balancing range of the pipe segment is provided in the axial direction adjacent to the end section, in which balancing range balancing weights can be mounted. Thus, when the connection device is used for drive shafts, the balancing of the drive shaft can take place directly at the area of the connection or adapter. Balancing weights are, for example, welded on or are fixed in a different manner known from the state of the art.

Other advantageous further developments of the invention are characterized in the subclaims and are illustrated in detail in the following together with the description of the preferred embodiment of the invention by means of the figures.

BRIEF DESCRIPTION OF THE DRAWING

FIG. 1 is a lateral, partially sectional view of the connection device according to an embodiment of the invention.

DETAILED DESCRIPTION OF THE DRAWING

FIG. 1 is a lateral view of the connection device, the lower half being illustrated as a sectional view. The shaft 2 is pressed onto the end section 3 of the pipe segment 4, so that the illustrated implementation shows the connection device 1 in its end (connected) condition. The radial outer surface of the end section 3 of the pipe segment 4 has a knurling 6, which extends in the axial direction essentially from the axial end edge of the shaft 2 to the section indicated by reference number 6'. As an example, the indicated implementation is schematic, but the preferred wall thickness of the end section 3, measured at the thickest point marked by reference number 3, is not larger than 2.5 mm, in the illustrated implementation, 1.8 mm.

In the end section 3 of the pipe segment, a supporting ring 5 is pressed in to an axial center area of the knurling 6. The wall thickness of the supporting ring 5 corresponds essentially to the wall thickness of the end section. For ensuring a press fit, the outside diameter of the supporting ring 5 is minimally larger than the inside diameter of the end section 3. In the axial direction, the supporting ring 5 extends over a predefined length, in the concrete example, over 15 mm.

In an area, which adjoins the knurled section of the end section 3 in the axial direction, the pipe segment 4 of the connection device 1 has a bead 7. The bead 7 is provided by radially outward-pressed material of the pipe segment 4. The balancing area 8 of the pipe segment 4 is provided adjoining the end section 3 or the bead 7 in the axial direction, in which balancing weights (not shown) are connected by welding. In the illustrated embodiment, the pipe segment 4 is made of steel and the shaft is made of CFRP.

For the purpose of sealing off dirt and moisture from the outside, an adhesive and sealing bead (not shown) may additionally be provided between the shaft 2 and the end section 3 of the pipe segment 4. This sealing bead would preferably be arranged in the circumferential direction in the area marked by reference number 6.

In its implementation, the invention is not limited to the above-described embodiment. On the contrary, a number of variants are contemplated, which use the illustrated solution also in the case of basically different implementations. It may, for example, be provided to construct the supporting ring to be thicker, but thinner in the axial direction. It is also contemplated to use an end section 3 of the pipe segment 4 with a diameter smaller than that marked D, in that the end section is further reduced and can therefore be adapted to shafts 2 of a smaller construction.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A connection for a shaft, comprising:
a pipe segment having an end section, the end section being located at a longitudinal end of the pipe segment, a radial outer surface of the end section of the pipe segment having external toothing;
a radially protruding bead that is adjacent to the end section, and having an outer diameter that is larger than an outer diameter of the end section;
a balancing area that is located on an opposite side of the radially protruding bead from the end section; and
a supporting ring arranged in an interior of the end section of the pipe segment, wherein
the end section of the pipe segment having the supporting ring and the radial outer surface with the external tooting are configured for the shaft to be slid over the end section,
an outer diameter of the end section of the pipe segment gradually decreases to a predetermined diameter along a longitudinal direction of the pipe segment, and
the balancing area having an outer diameter that is smaller than the outer diameter of the end section.

2. The connection according to claim 1, wherein the end section of the pipe segment has a thin-walled construction with a wall thickness of between 1.2 and 2.5 millimeters.

3. The connection according to claim 2, wherein an outer diameter of the supporting ring is larger than an inner diameter of the end section of the pipe segment.

4. The connection according to claim 3, further comprising a press-fit connection of the supporting ring in the interior of the end section of the pipe segment.

5. The connection according to claim 4, wherein the supporting ring has an axial dimension of from 10 to 20 millimeters.

6. The connection according to claim 1, wherein an outer diameter of the supporting ring is larger than an inner diameter of the end section of the pipe segment.

7. The connection according to claim 1, further comprising a press-fit connection of the supporting ring in the interior of the end section of the pipe segment.

8. The connection according to claim 1, wherein the supporting ring has an axial dimension of from 10 to 20 millimeters.

9. The connection according to claim 1, wherein the external toothing is a milled knurling.

10. The connection according to claim 9, wherein the milled knurling extends in a longitudinal axis of the end section of the pipe segment.

11. The connection according to claim 1, wherein the balancing area is configured to allow balancing weights to be mounted.

12. The connection according to claim 1, wherein the pipe segment is made of steel.

13. The connection according to claim 1, wherein
the support ring is disposed in the middle of the end section, and
the supporting ring extends, along a longitudinal direction of the end section, about one third of a length of the end section.

14. A connection for a shaft, comprising:
a pipe segment having
on an outer surface thereof a radially protruding bead, and external teeth disposed on a radial outer surface of the pipe segment adjacent to the radially protruding bead;
a balancing area that is located on an opposite side of the radially protruding bead from an end section; and a supporting ring arranged in an interior of the end section of the pipe segment, wherein
 the end section of the pipe segment having the supporting ring and the radial outer surface with the external teeth is configured for the shaft to be slid over the end section,
 the support ring is disposed in the middle of the end section,
 the supporting ring extends, along a longitudinal direction of the end section, about one third of a length of the end section,
 the radially protruding bead defines a breaking location at which the connection breaks when a predefined load is applied to the connection,
 the end section is located at a longitudinal end of the pipe segment,
 the radially protruding bead has an outer diameter that is larger than an outer diameter of the end section, and
 the balancing area has an outer diameter that is smaller than the outer diameter of the end section.

15. A connector assembly comprising:
a shaft;
a pipe segment having
 a radially protruding bead, and external teeth disposed on a radial outer surface of the pipe segment adjacent to the radially protruding bead; and
a supporting ring arranged in an interior of an end section of the pipe segment; and
a balancing area that is located on an opposite side of the radially protruding bead from the end section, wherein
 the end section of the pipe segment having the supporting ring and the radial outer surface with the external teeth are configured for the shaft to be slid over the end section,
 an outer diameter of the end section of the pipe segment gradually decreases to a predetermined diameter along a longitudinal direction of the pipe segment, to thereby accept cooperation with shafts of different sizes,
 the radially protruding bead defines a breaking location at which the connector assembly breaks when a predefined load is applied to the connector assembly,
 the end section is located at a longitudinal end of the pipe segment,
 the radially protruding bead has an outer diameter that is larger than an outer diameter of the end section, and
 the balancing area has an outer diameter that is smaller than the outer diameter of the end section.

16. The connector assembly according to claim 15, wherein the shaft is made of fiber-reinforced plastic.

17. The connector assembly according to claim 16, wherein the fiber-reinforced plastic is a carbon fiber reinforced plastic.

18. The connector assembly according to claim 17, wherein the shaft is a drive shaft of a motor vehicle.

\* \* \* \* \*